(12) United States Patent
Akiyama et al.

(10) Patent No.: US 7,104,136 B2
(45) Date of Patent: Sep. 12, 2006

(54) MULTI-COMPARTMENT PRESSURE SENSOR HOUSING APPARATUS

(75) Inventors: Yukiharu Akiyama, Tokyo (JP); Hisato Umemaru, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/918,404

(22) Filed: Aug. 16, 2004

(65) Prior Publication Data

US 2005/0268723 A1   Dec. 8, 2005

(30) Foreign Application Priority Data

Jun. 7, 2004   (JP)   ............... 2004-168359

(51) Int. Cl.
*G01L 7/08* (2006.01)
*G01L 7/00* (2006.01)

(52) U.S. Cl. .......................................... 73/715; 73/756
(58) Field of Classification Search .................. 73/715, 73/756
See application file for complete search history.

(56) References Cited

U.S. PATENT DOCUMENTS

| 5,948,989 A | 9/1999 | Ichikawa et al. |
| 6,003,379 A | 12/1999 | Ichikawa et al. |
| 6,055,864 A * | 5/2000 | Stiller et al. .................. 73/724 |
| 6,443,015 B1 * | 9/2002 | Poulin et al. ................. 73/724 |
| 6,604,430 B1 * | 8/2003 | Saito et al. .................... 73/756 |
| 6,993,973 B1 * | 2/2006 | Lischer et al. ................ 73/724 |
| 2004/0255660 A1 * | 12/2004 | Abdolhosseini et al. ... 73/118.2 |

FOREIGN PATENT DOCUMENTS

| DE | 39 18 769 A1 | 12/1989 |
| DE | 38 23 449 A1 | 1/1990 |
| DE | 195 17 676 A1 | 11/1996 |
| JP | 65-54226 A | 3/1989 |
| JP | 09195813 A | 7/1997 |
| JP | 11-30535 A | 2/1999 |

* cited by examiner

*Primary Examiner*—Edward Lefkowitz
*Assistant Examiner*—George P Bonanto
(74) *Attorney, Agent, or Firm*—Sughrue Mion, PLLC

(57) ABSTRACT

A pressure sensor apparatus having capability of preventing invasion of foreign materials into a pressure sensor with a simplified structure includes the pressure sensor (1) for detecting pressure of a fluid for measurement, and a sensor container (2) for housing therein the pressure sensor (1). The sensor container (2) is connected to a pressure intake port (13) formed in a pipe (12) through which the fluid for measurement flows. The sensor container (2) includes a wall (17) for defining a second compartment (16) located in opposition to the pressure intake port (13) and a first compartment (15) having a pressure introducing port (14) for introducing the fluid for measurement extracted through the pressure intake port (13) to the pressure sensor (1).

8 Claims, 4 Drawing Sheets

MULTI-COMPARTMENT PRESSURE SENSOR HOUSING APPARATUS

BACKGROUND OF THE INVENTION

1. Field of the Invention

The present invention relates to a pressure sensor apparatus for detecting or measuring a pressure of an object or fluid whose pressure is to be detected or measured such as, for example, a pressure sensor apparatus mounted on an intake manifold of an intake system of an internal combustion engine for detecting the intake air pressure. Hereinafter, the object or fluid whose pressure is to be detected or measured will be referred to as the fluid for measurement only for the convenience of description.

2. Description of Related Art

Heretofore, such pressure sensor apparatus is known in which invasion of foreign materials into a pressure sensor constituting a major part of the pressure sensor apparatus is prevented by providing a barrier plate for causing the foreign materials to flow around the pressure sensor. In this connection, reference may have to be made to, for example, Japanese Patent Application Laid-Open Publication No. 30535/1999 (JP-A-1999-30535) (FIG. 1).

In the pressure sensor apparatus mentioned above, invasion of the foreign materials into the pressure sensor can certainly be prevented by providing the barrier plate. However, to this end, it is required to prepare a dedicated barrier plate, which gives rise to a problem that the manufacturing cost of the pressure sensor apparatus is correspondingly increased, to a disadvantage.

SUMMARY OF THE INVENTION

In the light of the state of the art briefed above, it is an object of the present invention to provide an improved pressure sensor apparatus in which prevention of invasion of the foreign materials into the pressure sensor can positively be realized with a simplified structure without need for preparing a dedicated member such as the dedicated barrier plate.

In view of the above and other objects which will become apparent as the description proceeds, there is provided according to a general aspect of the present invention a pressure sensor apparatus which includes a pressure sensor for detecting a pressure of a fluid for measurement, and a sensor container which houses therein the pressure sensor, wherein the sensor container is connected to a pressure intake port of a pipe through which the fluid for measurement flows.

In the pressure sensor apparatus described above, the sensor container includes a wall for defining a second compartment facing in opposition to the pressure intake port and a first compartment having a pressure introducing port for introducing the fluid for measurement extracted through the pressure intake port to the pressure sensor.

With the structure of the pressure sensor apparatus according to the present invention, invasion of the foreign materials into the pressure sensor can positively be prevented with a much simplified structure without need for preparing a member dedicated to this end.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
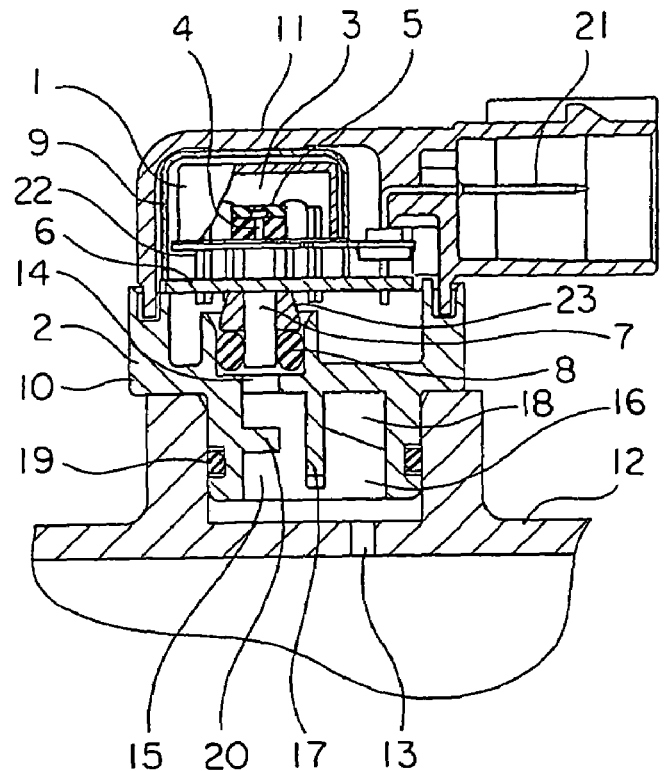
FIG. 1 is a front view showing in section a pressure sensor apparatus according to a first embodiment of the present invention.

The present invention will be described in detail in conjunction with what is presently considered as preferred or typical embodiments thereof by reference to the drawings. In the following description, like reference characters designate like or corresponding parts or portions throughout the several views.

Embodiment 1

FIG. 1 is a front view showing in section a pressure sensor apparatus according to a first embodiment of the present invention.

The pressure sensor apparatus includes a pressure sensor 1 destined for detecting the pressure prevailing within an intake system of an internal combustion engine and a sensor container 2 in which the pressure sensor 1 is housed.

A reference chamber 3 is formed internally of the pressure sensor 1. Disposed at the center of the reference chamber 3 is a pressure detecting element 5 which is formed of silicon. The pressure detecting element 5 has a peripheral edge portion at and along which the pressure detecting element 5 is secured fluidtightly. A pressure application chamber 4 is formed interiorly of the pressure detecting element 5. The pressure detecting element 5 includes a diaphragm portion partially formed thin and a gauge resistor formed on the diaphragm. A pipe 7 is connected to the pressure application chamber 4 for introducing the air, the fluid for measurement, into the pressure application chamber 4.

The diaphragm portion of the pressure detecting element 5 is susceptible to deformation in proportion to the air pressure under the action of the pressure difference between the pressure application chamber 4 and the reference chamber 3. The resistance value of the gauge resistor changes in correspondence to the deformation mentioned above, as a result of which a voltage of the value proportional to the resistance value and thus indicative of the air pressure is outputted externally through the medium of a lead wire 22.

The pressure sensor 1 has a circuit board 6 through which the pipe 7 extends and onto which the lead wire 22 is secured by soldering. A terminal 21 extends outwardly from an end portion of the circuit board 6 for taking out the output signal of the pressure sensor 1.

The sensor container 2 is composed of a base 10 formed of a resin in an integral structure by molding and a housing 11 also formed a resin in an integral structure by molding and bonded to a peripheral edge portion of the base 10. Disposed between the base 10 and the housing 11 is a cover 9 which covers the pressure sensor 1 as a whole except for the pipe 7.

The pipe 7 is connected to the base 10 fluidtightly or airtightly with an O-ring 8 being interposed therebetween. A pressure introducing port 14 is formed in opposition to the tip end face of the pipe 7 for introducing the air into the pressure introducing port 14. The O-ring 8 is positioned stationarily by means of a holder 23 disposed between the base 10 and the circuit board 6.

Figure 2:
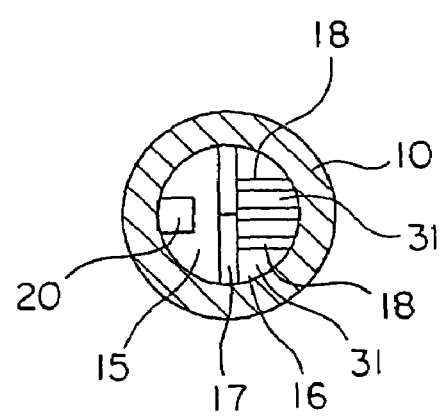
FIG. 2 is a bottom view showing in section a major portion of the pressure sensor apparatus shown in FIG. 1.
Figure 3:
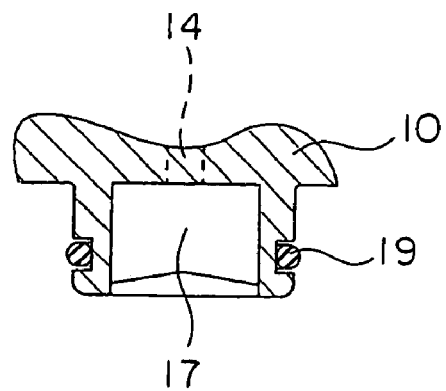
FIG. 3 is a side view showing in section a major portion of the pressure sensor apparatus shown in FIG. 1.

The base 10 is mounted airtightly onto an intake manifold 12 of an internal combustion engine by means of an O-ring 19. The interior of the base 10 is divided into a first compartment 15 and a second compartment 16 by a partitioning wall 17, as can be seen in FIG. 2. The pressure introducing port 14 is formed in a bottom wall of the first compartment 15 which is opened at one side, while formed in a side wall of the first compartment 15 is a projecting portion 20 which faces oppositely to the pressure introducing port 14 for intercepting the foreign materials flowing together with the air toward the pressure introducing port 14. The wall 17 has such an overall height profile that the height of the wall 17 gradually decreases toward the pressure introducing port 14 so that the wall 17 generally presents an inverted triangle shape, as shown in FIG. 3. By virtue of such profile of the wall 17, liquid foreign materials adhering to the end surface of the wall 17 tends to flow downwardly in the direction away from the pressure introducing port 14.

The pressure introducing port 14 is so formed as to extend in the direction along the inner side surface of the first compartment 15 with the projecting portion 20 being positioned in a plane of projection of the pressure introducing port 14.

A pressure intake passage or port 13 formed in the intake manifold 12 is located in front of the second compartment 16 distanced from the pipe 7. The second compartment 16 is subdivided into a plurality of partitioned cells 31 by means of small walls 18 each having the overall height lower than that of the wall 17. The height of the small wall 18 also decreases gradually toward the pressure introducing port 14 so that the liquid foreign materials adhering to or deposited on the end surfaces of the small walls 18 can flow downwardly away from the pressure introducing port 14.

Incidentally, although the small walls 18 are shown as being vertically disposed in parallel with the wall 17, it should be understood that such disposition of the small walls 18 is not necessarily required for carrying out the present invention. The small walls 18 may be disposed, for example, in a lattice-like pattern. What is required is that the inner surface area of the second compartment 16 is increased. So far as this requirement is satisfied, any arrangement or array of the small walls 18 may be adopted. However, it is necessary to dimension the height of the small wall 18 lower than that of the wall 17.

With the structure of the pressure sensor apparatus described above, the air, i.e., a fluid for measurement, sucked through the pressure intake port 13 formed in the intake manifold 12 constituted by a pipe flows toward the second compartment 16. In that case, the foreign materials such as oil particles or the like carried by the air flow strikes against the bottom wall, the side wall and the small walls 18 of the second compartment 16 to be deposited thereon, whereby invasion of the foreign materials into the first compartment 15 is considerably suppressed.

Besides, because the projecting portion 20 which intercepts the foreign materials flowing toward the pressure introducing port 14 is disposed in front of the pressure introducing port 14 within the first compartment 15, the foreign materials are caused to be deposited on the projecting portion 20 as well.

Thereafter, the air flows into the pressure application chamber 4 through the pressure introducing port 14 and the pipe 7, as a result of which the diaphragm portion of the pressure detecting element 5 undergoes deformation in proportion to the air pressure under the effect of the pressure difference between the pressure application chamber 4 and the reference chamber 3. Then, the resistance value of the gauge resistor changes in correspondence to the deformation mentioned above. The voltage of the value proportional to the resistance value and indicative of the air pressure is taken out as the output signal of the pressure sensor 1 through the lead wire 22 and the terminal 21.

As is apparent from the foregoing, with the pressure sensor apparatus of the structure described above, the base 10 of the sensor container 2 is divided into the first compartment 15 and the second compartment 16 by the wall 17 such that a major part of the air flows into the first compartment 15 by way of the second compartment 16. Thus, direct invasion of the foreign materials carried by the air into the pressure sensor 1 through the first compartment 15 can be suppressed with a simplified structure.

Furthermore, because the second compartment 16 is subdivided into a plurality of partitioned cells 31 so that surface area internally of the second compartment 16 increases, a correspondingly increased amount of foreign materials is deposited within the second compartment 16.

Additionally, since the overall height of the small wall 18 is dimensioned lower than that of the wall 17, the foreign materials striking against and bouncing off the tip end portions of the small walls 18 are thereby prevented from flowing directly into the first compartment 15.

Moreover, because the wall 17 is so formed that the height thereof gradually decreases in the direction toward the pressure introducing port 14 and because each of the small walls 18 is also so formed that the height thereof gradually decreases toward the pressure introducing port 14, the liquid foreign materials deposited on the end surfaces of the wall 17 and the small walls 18 tend to flow downwardly in the direction away from the pressure introducing port 14, whereby invasion of the foreign materials into the pressure sensor 1 is correspondingly suppressed.

Even if the foreign materials should flow into the first compartment 15, the foreign materials are then forced to flow around the projecting portion 20 disposed in front of the pressure introducing port 14 in order to flow into the pressure sensor 1. Thus, invasion of the foreign materials into the pressure sensor 1 can positively be suppressed.

Additionally, because the pressure introducing port 14 is so formed as to extend in the direction along the inner side wall of the first compartment 15 with the projecting portion 20 being disposed in the plane of projection of the pressure introducing port 14, die structure required for forming integrally the base 10 of a resin by molding can be simplified.

Embodiment 2

Figure 4:
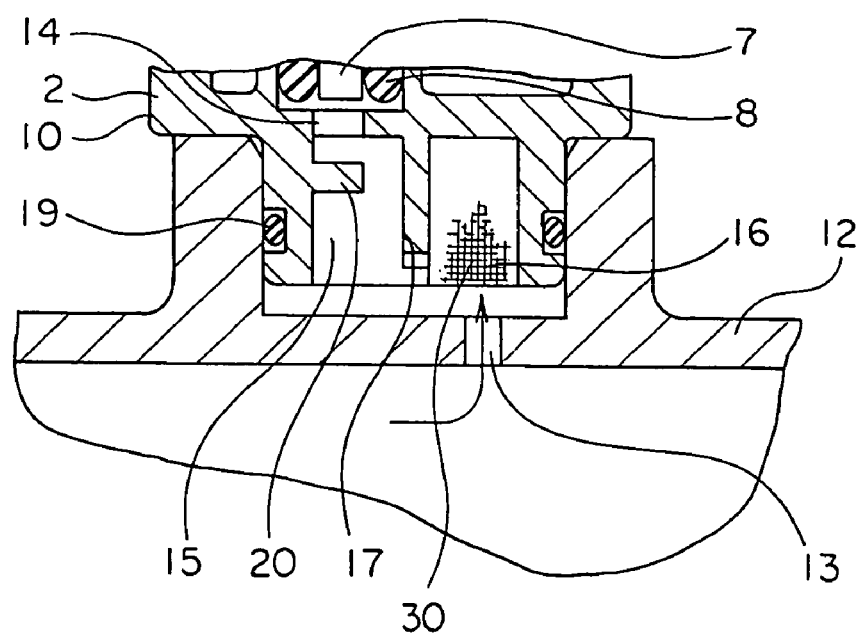
FIG. 4 is a fragmental front view showing in section the pressure sensor apparatus according to a second embodiment of the present invention.

FIG. 4 is a fragmental front view showing in section the pressure sensor apparatus according to a second embodiment of the present invention.

In the pressure sensor apparatus according to the instant embodiment of the invention, a filter 30 having an air permeability or breathability for depositing thereon the foreign materials is disposed in the inner space defined within the second compartment 16 from which the small walls 18 mentioned previously in conjunction with the first embodiment of the invention have been eliminated.

In the other respects, the structure of the pressure sensor apparatus is essentially identical with that of the pressure sensor apparatus according to the first embodiment of the invention.

With the structure of the pressure sensor apparatus according to the instant embodiment of the invention, invasion of the foreign materials into the pressure sensor 1 can satisfactorily be suppressed with the aid of the filter 30.

Embodiment 3

Figure 5:
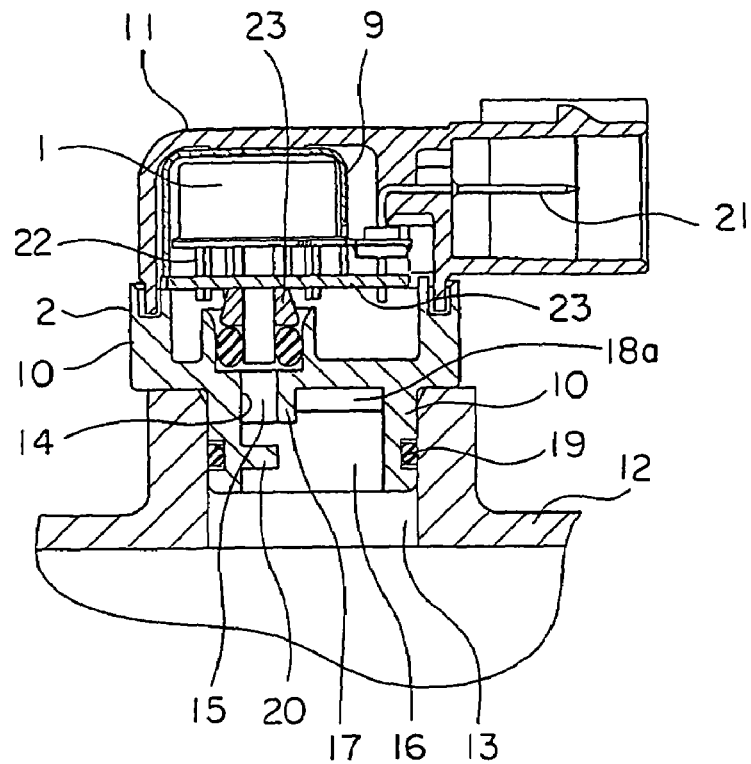
FIG. 5 is a front view showing in section the pressure sensor apparatus according to a third embodiment of the present invention.

FIG. 5 is a front view showing in section the pressure sensor apparatus according to a third embodiment of the present invention.

Figure 6:
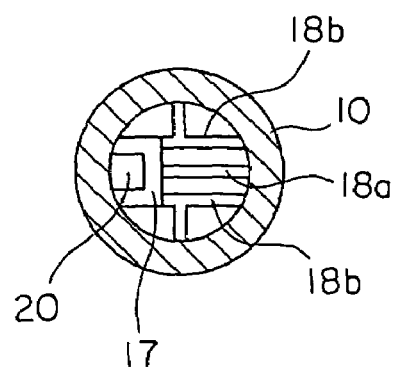
FIG. 6 is a bottom view showing in section a major portion of the pressure sensor apparatus shown in FIG. 5.

In the pressure sensor apparatus according to the instant embodiment of the invention, the pressure introducing port 14 is so formed as to extend in the direction along the inner side wall of the first compartment 15 with the projecting portion 20 being disposed in the plane of projection of the pressure introducing port 14. Further, the wall 17 through which the first compartment 15 and the second compartment 16 are partitioned from each other is formed on the bottom surface of the base 10 so as to enclose the projecting portion 20, as viewed from the side of the pressure intake port 13. Refer to FIG. 6. From the one side wall of the wall 17, small walls 18a and 18b each of a height lower than the wall 17 extend to subdivide the second compartment 16 into six cells.

With regards to the other structure, the pressure sensor apparatus according to the instant embodiment of the invention is essentially same as the pressure sensor apparatus according to the first embodiment.

With the structure of the pressure sensor apparatus according to the third embodiment of the invention, advantageous action and effect similar to those described hereinbefore in conjunction with the pressure sensor apparatus according to the first embodiment can be obtained. In addition, even in the case where the pressure intake port 13 at which the pressure sensor apparatus is mounted on the intake manifold is of a large size, the second compartment 16 faces in opposition to the pressure intake port 13. Consequently, the air sucked from the intake manifold 12 flows into the first compartment 15 through the second compartment 16, and there occurs no such situation that the air is introduced into the pressure sensor 1 directly through the first compartment 15.

Figure 7:
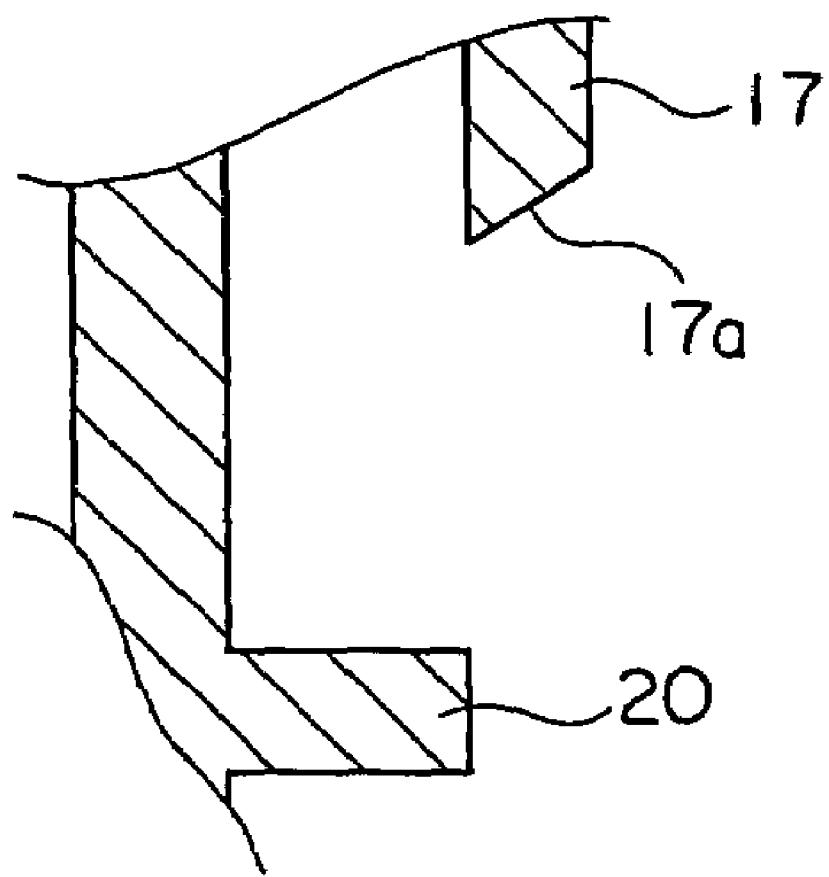
FIG. 7 is a view showing a modification of a wall shown in FIG. 5.

In this conjunction, it should be mentioned that the end face 17a of the wall 17 of C-like cross-section may be inclined in such a manner as illustrated in FIG. 7. In that case, the foreign materials striking against the end face 17a can be introduced into the second compartment 16.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described.

By way of example, in the foregoing description of the various embodiments of the present invention, it has been assumed that the present invention is applied to the pressure sensor apparatus which is mounted on the intake manifold 12 for detecting the intake air pressure in the internal combustion engine. However, it goes without saying that the teachings of the present invention can equally find application to the detection of other sorts of pressures.

Further, although the foregoing description has been directed to the pressure sensor incorporating the pressure detecting element disposed so as to define the hermetically closed reference chamber and the pressure application chamber for detecting the pressure of the intake air as the fluid for measurement. It should however be understood that this is only by way of example. The present invention can of course be applied to the apparatus incorporating the pressure sensor for detecting the pressure of other fluids for measurement in general.

Besides, although it has been described in conjunction with the various embodiments of the invention that the projecting portion 20 is disposed in the plane of projection of the pressure introducing port 14. However, the projecting portion may be so disposed as to extend outside of the plane of projection of the pressure introducing port.

Accordingly, all suitable modifications and equivalents may be resorted to, falling within the scope of the invention.

What is claimed is:

1. A pressure sensor apparatus, comprising:
   a pressure sensor for detecting pressure of a fluid for measurement; and
   a sensor container for housing therein said pressure sensor, said sensor container comprising a base and a housing, the base comprising a bottom surface and at least one side wall wherein said pressure sensor is located in the housing of the sensor container, said sensor container being connected to a pressure intake port of a pipe through which said fluid for measurement flows,
   wherein said sensor container includes a wall for defining a second compartment located in opposition to said pressure intake port and a first compartment having a pressure introducing port for introducing said fluid for measurement extracted through said pressure intake port into said pressure sensors,
   wherein said wall projects from the bottom surface of said base to divide said base into said first and second compartments; and
   wherein the pressure introducing port is formed in the bottom surface.

2. A pressure sensor apparatus according to claim 1, wherein said second compartment is subdivided into a plurality of partitioned cells by a small wall.

3. A pressure sensor apparatus according to claim 1, wherein a filter for removing foreign materials is disposed within said second compartment.

4. A pressure sensor apparatus according to claim 2, wherein said small wall has an overall height which is lower than that of said wall.

5. A pressure sensor apparatus according to claim 1,
wherein said wall has an overall height which gradually decreases in a direction toward said pressure introducing port so that liquid foreign materials deposited on an end face of said wall flows downwardly in the direction away from said pressure introducing port.

6. A pressure sensor apparatus according to claim 2,
wherein said small wall has an overall height which gradually decreases in a direction toward said pressure introducing port so that liquid foreign materials deposited on an end face of said small wall flows downwardly away from said pressure introducing port.

7. A pressure sensor apparatus according to claim 1,
wherein a projecting portion is disposed in opposition to said pressure introducing port for intercepting foreign materials flowing toward said pressure introducing port.

8. A pressure sensor apparatus according to claim 7,
wherein said sensor container is formed integrally of a resin, and
wherein said projecting portion projects from an inner surface of the side wall of said first compartment.

* * * * *